United States Patent [19]

Lowe et al.

[11] Patent Number: 5,462,275

[45] Date of Patent: Oct. 31, 1995

[54] PLAYER INTERACTIVE LIVE ACTION FOOTBALL GAME

[75] Inventors: Danny D. Lowe, 37 Woodhaven View SW.; Gordon G. Wilson; Michael E. Baker; Abram Gamer, all of Calgry, Canada

[73] Assignees: Gordon Wilson; Danny D. Lowe, both of Calgary, Canada

[21] Appl. No.: 811,226

[22] Filed: Dec. 20, 1991

[51] Int. Cl.$^6$ ............................................. A63F 9/00
[52] U.S. Cl. ................... 273/94; 273/85 G; 273/85 R; 273/55 R; 273/434; 364/410
[58] Field of Search .................. 273/55 R, 85 R, 273/94, 85 G, 433–436; 364/410; 273/433–436; 340/323 R

[56] References Cited

U.S. PATENT DOCUMENTS

| | | | |
|---|---|---|---|
| 4,249,735 | 2/1981 | Bromley | 273/94 |
| 4,304,404 | 12/1981 | Pundt | 273/85 G |
| 4,327,915 | 5/1982 | Bromley | 273/94 |
| 4,342,454 | 8/1982 | Baer et al. | 273/85 G |
| 4,357,014 | 11/1982 | Baer et al. | 273/85 G |
| 4,391,444 | 7/1983 | Bromley | 273/94 |
| 4,422,639 | 12/1983 | Del Principe et al. | 273/94 |
| 4,582,323 | 4/1986 | Minkoff et al. | 273/94 |
| 4,662,635 | 5/1987 | Enokian | 273/94 |
| 4,766,541 | 8/1988 | Bleich et al. | |
| 4,799,677 | 1/1989 | Frederiksen | 273/435 |
| 5,026,058 | 6/1991 | Bromley | 273/88 |
| 5,067,079 | 11/1991 | Smith III, et al. | 364/410 |

FOREIGN PATENT DOCUMENTS

| | | | |
|---|---|---|---|
| 1221761 | 5/1987 | Canada . | |
| 1232093 | 1/1988 | Canada . | |
| 1236217 | 5/1988 | Canada . | |
| 8302566 | 8/1988 | WIPO | 273/94 |

Primary Examiner—Jessica J. Harrison
Assistant Examiner—Kerry Owens
Attorney, Agent, or Firm—Burke-Robertson

[57] ABSTRACT

A player interactive live action football game which may be played for example on a television screen. A player interactive live action football game is provided which comprises a random access storage and retrieval device and a plurality of individual, pre-recorded action football plays illustrating interaction of players of opposite teams. This information is stored in random access storage and retrieval device and accessible according to type of play. The invention further comprises a microprocessor and microprocessor control device electronically associated with the random access storage and retrieval device. The microprocessor is programmed to enable one or more users to select in sequence, through the control device, different football plays according to play type. A display device is electronically associated with the microprocessor to enable the selected plays to be viewed by the users. The microprocessor is further programmed to evaluate and cumulate play results and report them to the users in a meaningful way. It is an object of the present invention to provide an interactive, live action football game that can be played by one or more persons in a home, bar or the like. It is a further object of the present invention to provide such a television game which permits players to select full motion video images, as opposed to computer graphics, to play such game and determine the outcome.

19 Claims, 7 Drawing Sheets

PLAYER INTERACTIVE LIVE ACTION FOOTBALL GAME

BACKGROUND OF THE INVENTION

The present invention relates to a player interactive live action football game which may be played for example on a television screen.

Video games featuring sports including football are well known. Such video games generally incorporate computer generated graphics stored in a memory and accessed by a computer. Examples of such computer graphics video games are described and illustrated in Canadian Patent No. 1,221, 761 issued May 12, 1987 of Hueda et al, Canadian Patent No. 1,236,217 issued May 3, 1988 of Bromley et al and Canadian Patent No. 1,232,093 issued Jan. 26, 1988 of Tatsumi et al.

U.S. Pat. No. 4,766,541 issued Aug. 23, 1988 of Bleich et al describes and illustrates a video game or the like which includes a real time interactive video disc game-play background generation system. The discs contain video data which is under the control of the game processor, whereby the sequence of frames to be played can be varied on a frame by frame basis.

SUMMARY OF THE INVENTION

In accordance with the present invention a pre-recorded live action and live or synthesized with electronically generated graphics overlay sound full motion video interactive football game is provided which comprises a random access storage and retrieval means and a plurality of individual, pre-recorded action football plays illustrating interaction of players of opposite teams. This information is stored in random access storage and retrieval means and accessible according to type of play. The invention further comprises a microprocessor and microprocessor control means electronically associated with the random access storage and retrieval means. The microprocessor is programmed to enable one or more users to select in sequence, through the control means, different football plays according to play type. A display means is electronically associated with the microprocessor to enable the selected plays to be viewed by the users. The microprocessor is further programmed to evaluate and cumulate play results and report them to the users in a meaningful way. The microprocessor then, by using statistical tables, to select the actual football play according to play type selected by the user.

Preferably the live action football plays are recorded on a field without grid lines and numbers. The game is further provided with means to electronically generate a display of a grid of yard lines and numbers on the field on the display means corresponding to the play action and location of the teams on the field.

The football game according to the present invention may store the video material using laser disc technology, and may also store audio material for real-time playback of voice, music and sound effects. The game as played appears to the viewers to be a real television broadcast of a live game, the content of which is dictated by selections of plays by the users. The game according to the present invention is unique in that it permits the viewer to interact with what appears to be an actual televised professional American style football game.

It is an object of the present invention to provide an interactive, live action football game that can be played by one or more persons in a home, bar or the like. It is a further object of the present invention to provide such a television game which permits the players to select full motion video images, as opposed to computer generated graphics, to play such game and determine the outcome.

BRIEF DESCRIPTION OF THE DRAWINGS

These and other objects and advantages of the invention will become apparent upon reading the following detailed description and upon referring to the drawings in which.

Figure 1:
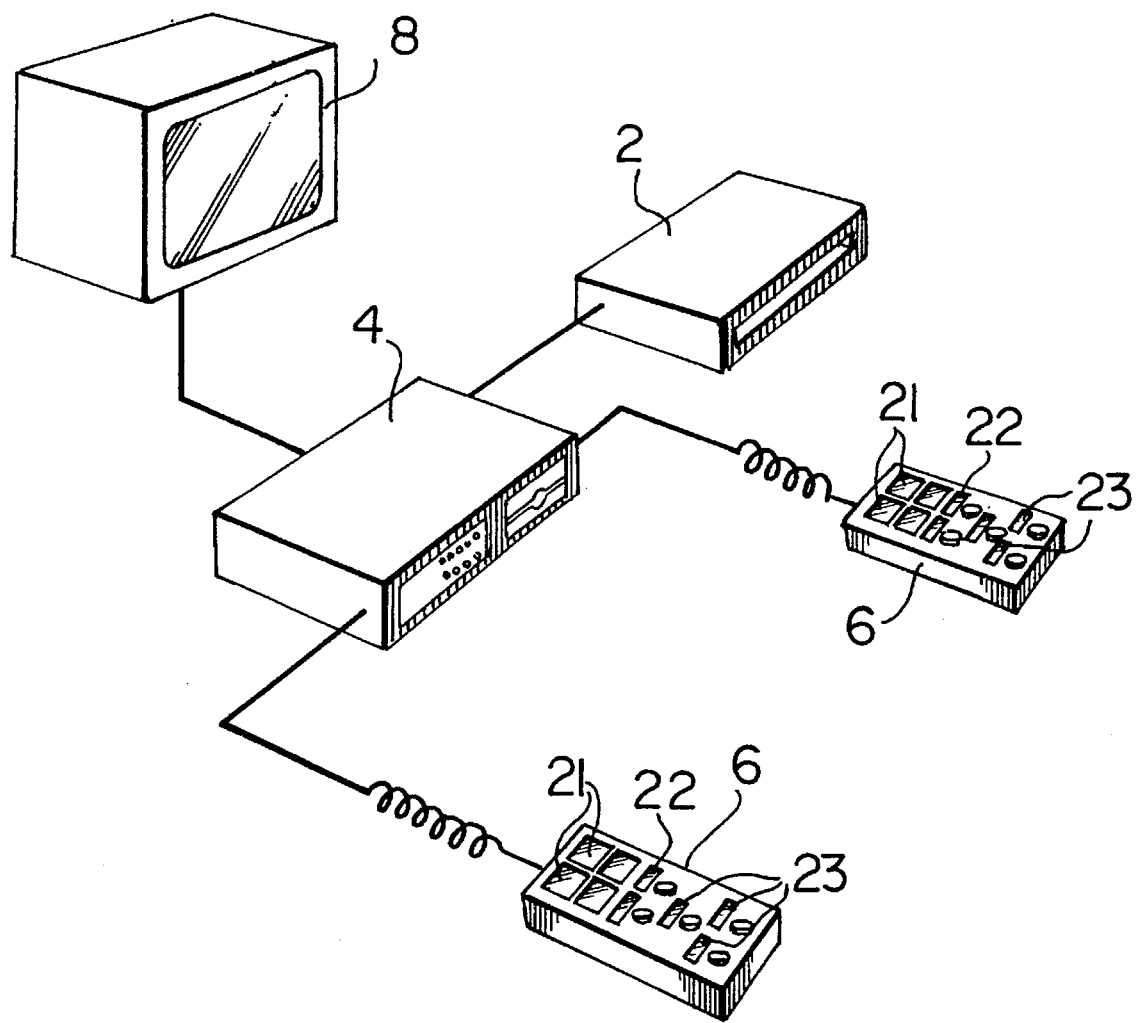
FIG. 1 is a schematic view of the game components of the game in accordance with the present invention.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

FIG. 1 illustrates schematically the various hardware components of the football game system in accordance with the present invention. A random access storage and retrieval means 2, preferably a laser disc storage device 1 is electronically associated with a microprocessor 4, control modules 6 and T.V. monitor 8 as illustrated. Laser video disc storage device 2 preferably additionally provides for storage and retrieval of audio information on audio channels. Alternatively, audio information may be stored on a separate, audio storage means (not illustrated) with audio information being correlated to video information by means of microprocessor 4.

Figure 2:
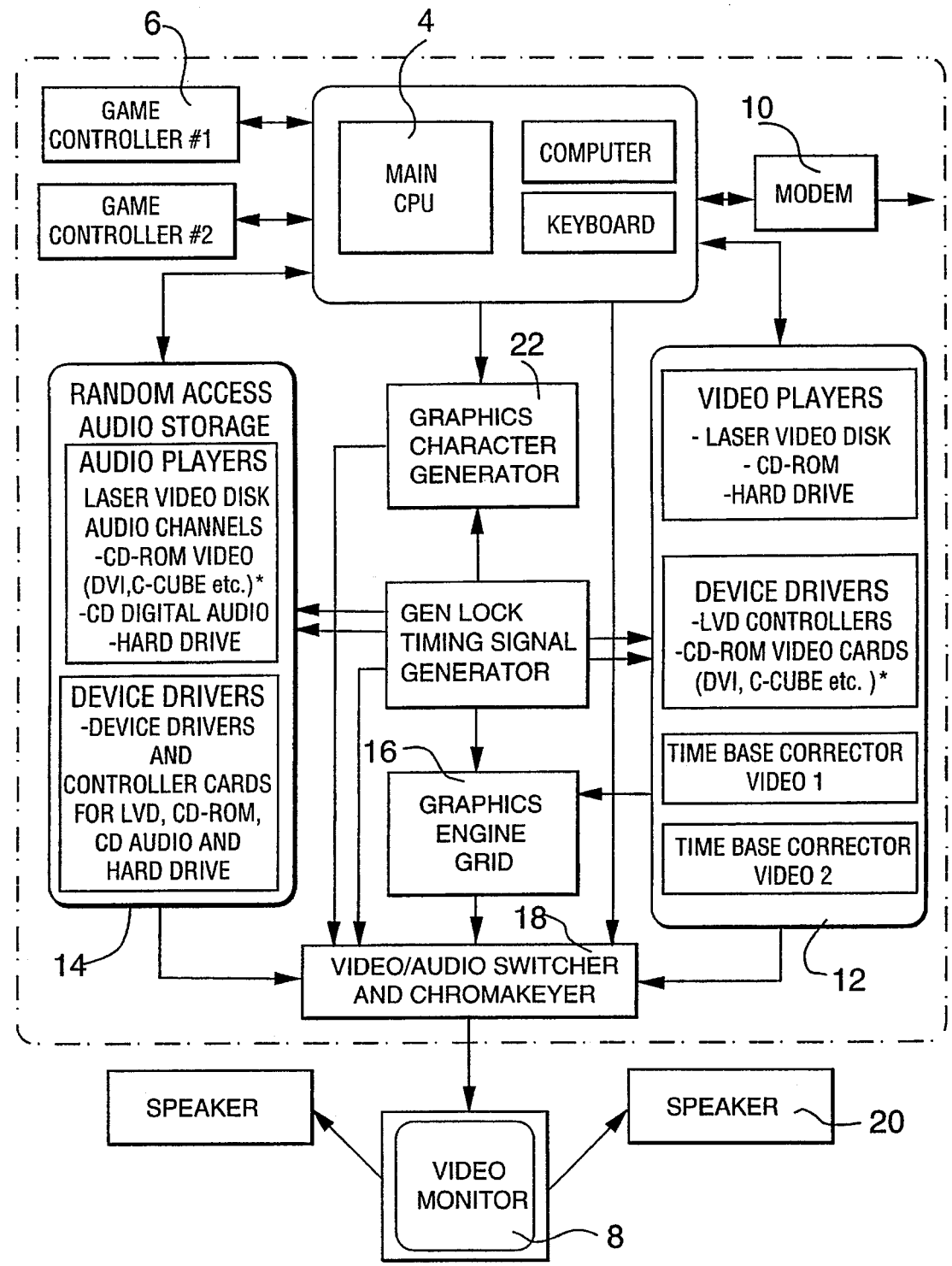
FIG. 2 is a schematic block diagram showing the component layout of the game according to the present invention.

In more functional terms, the main components of the game system according to the present invention are illustrated in FIG. 2. These components may be defined as eight basic components:

1) input devices 6
2) central processing unit 4
3) modem 10
4) video storage/retrieval means 12
5) audio storage/retrieval means 14
6) graphic generation means 16
7) video/audio routing means 18
8) t.v. monitor 8, speakers 20

With the exception of the t.v. monitor and two game controlled modules 6, all of these components may be physically contained in a single enclosure or cabinet.

The input devices include the two game control modules 6 and a signal receiver (not illustrated) in main computer unit (CPU) 4. Control modules 6 communicate to the signal receiver using either infrared pulses, ultrasonic audio waves or low powered radio waves with a pulse code modulated security code. The game control modules 6 preferably have five input buttons that control all game functions. Each input command on the game control module will be accompanied with an appropriate prompt on the control module's LED or fluorescent LCD display. The display information is broken into four main sections:

1) prompt display
2) timer display
3) status display
4) input display

The prompt display is the main display 21, located near the top of the game controller, that will prompt the player for the next input or tell them to wait or display other such information. The display will flash either the word <SELECT> or the word <WAIT>. To the right of this flashing prompt, on the same prompt display line, there will be a 20 character display that will indicate the type of selection required (i.e. Type of Play) or explain the wait condition (i.e. Time Out Called). A full list of all character displays can be found in the section "Game Controller Character display Breakdown".

In the upper right corner of the game controller, there is preferably a two digit numeric display 22 with large sized characters. This numeric display is the Clock Timer display and will indicate the amount of time left to enter a decision once a prompt has been issued. The standard countdown during a play sequence will be from 30 seconds backward to zero. If an offensive call has not been made by that time there will be a Delay of Game Penalty issued to the offense.

In addition to the <SELECT> input prompt and the numeric Countdown Timer display, there is also a 14 character alphanumeric display 23 beside each of the 5 input buttons. These displays will identify the input command for each button. For example, if the prompt requests "<SELECT> Type of Play", then to the right of each of the 5 inputs buttons will be a display showing the type of play that button will select.

EXAMPLE

<SELECT> Type of Play
Run
Pass
Kick
Time Out
Quit

If "Run" is selected then the Prompt Display and the five Input Displays will change to read:

<SELECT> Type of Run
Wide Left
Dive Left
Up the Middle
Dive Right
Wide Right

The selected response is then received by CPU 4 and processed along with other game factors, as will be described in more detail hereinafter, to determine which video play sequence or other video sequence (such as Time Out, etc.) will be used next. It will then communicate with the other components in the system to set up the next video sequence.

CPU 4 also locates where all video and audio elements are stored in video storage and retrieval means 12 and audio storage and retrieval means 14. Once the locations of these elements have been identified, they must be ordered into the proper order for sequencing. Then commands are issued to the proper device controllers to cue up the first elements needed to start the sequence.

Video storage and retrieval means 2 can be any video storage system that has sufficient storage capacity for the required program, providing it is capable of random access, within the limited time frame of the parameters of the game, to all video sequences stored in this medium. Suitable storage mediums that meet these requirements include laser video disc, CD-ROM compact disc and RAM hard drive. (Video stored in a digital format will probably use compression techniques such as Intel's "DVI System" Trade-mark). As new storage mediums are developed any medium meeting the storage and random access requirements of the present invention can be used.

The video images stored in this medium will be full motion video (i.e. thirty video frames per second). These images can be stored in analog form as on a Laser Video Disk (CAV or CLV formats), or as compressed digital data (CD-ROM) using video compression techniques. The resolution of the image may vary depending on the type of system used but in all cases the final video output will match the video system used in the country or region of use. In North America for example, the video output will be NTSC Standard. In Europe it will be a PAL/Secam dual format. A Standards Conversion Unit can be installed down stream from the system so that all images are stored and controlled in NTSC format with the final video output going through the Standards Conversion Unit converting it to PAL/Secam. The other alternative is to store and display the video data entirely in the local broadcast format used and, since the video frame rate for PAL/SECAM is 25 video frames per second, this would require rewriting the control program and data base to work in base 25 rather than base 30.

The Audio Storage and retrieval means 14 can utilize several different formats. More than one of these formats may be utilized in the final design. The major storage format will be in accordance with the final video format used. If, for example, the final video format is Laser Video Disk, then most of the audio will be stored on the existing audio tracks used on Laser Video Disk. This format will permit the use of two audio tracks that share common frame numbers with the video portion. In other words, for each addressable video frame on the Laser Video Disk as there are two corresponding Audio frames with the same address. Additional audio tracks can be located on other Laser Video Disks run in sync with the main video sequence. Another possible source is a CD-Audio Company (Trade-mark) Disk running in sync with the video using a similar frame code addressing system. Digitized sound can also be stored on hard disk drive for extremely fast random access. Regardless of the Storage Format used, the audio storage requirements are the same as the video storage requirements in that they must have large capacity and random access capability.

The graphic character generation means 16 generates the yard lines and yard numbers for the field, in a manner which will be described more particularly hereinafter. The decoding of the digitized position code (referred to subsequently herein) is processed by the graphics engine independent of the CPU 4. Since the field markings must be generated in real time, the graphics engine (grid generator) must preferably be totally dedicated to the task and perform no other functions.

Other graphics such as game statistics and players names for the video inserts may be generated by a graphics character generator. This generator is required to generate characters and simple lines for underlining titles. It must generate several sizes of font in different colors. It does not operate in real time as does the graphics engine (grid generator) so that the speed requirements for this system are greatly reduced. There are several video character generators (analog and digital) currently available which fulfill these requirements.

All graphics are routed to the video/audio switcher and chromakeyer 18 for insertion into the video picture. The video/audio switcher 18 can be either analog or digital. In analog form the device would be a standard video/audio switcher controlled by the main CPU through a General Periphery Interface (GPI). The video switcher would generate the wipe effects that link the video sequences together and it would include an upstream chromakeyer. The chromakeyer enables the system to insert graphics over the entire picture (i.e. score inserts, statistics, players names etc.) or insert the grid markings of yard lines and numbers over the specific colour (i.e. chroma) that matches the grass on the playing field. Any other colour, such as the football players, will not be keyed out and therefore appear over top of the field markings.

The video switcher also manages audio routing of the final mixed audio.

There are a number of low cost analog switching devices available on the market. In the digital domain, video and audio switching as well as chromakeying can be handled with a number of "off the shelf" VGA to Video adaptor cards currently available for the IBM platform. Many of these cards allow the use of wipes and keys in their basic format as well as a number of other Digital Video Effects (DVE) that can be incorporated into the production design of the program.

The modem 10 will operate under control of the CPU 4. During play it may feed control Program information through to other game systems at other locations. When the system is not being used it will periodically report back to a central Service Center and Data Base (not illustrated) supplying current information on Usage for marketing analysis as well as reporting back to the Service Center for any trouble or equipment failure.

Figure 3:
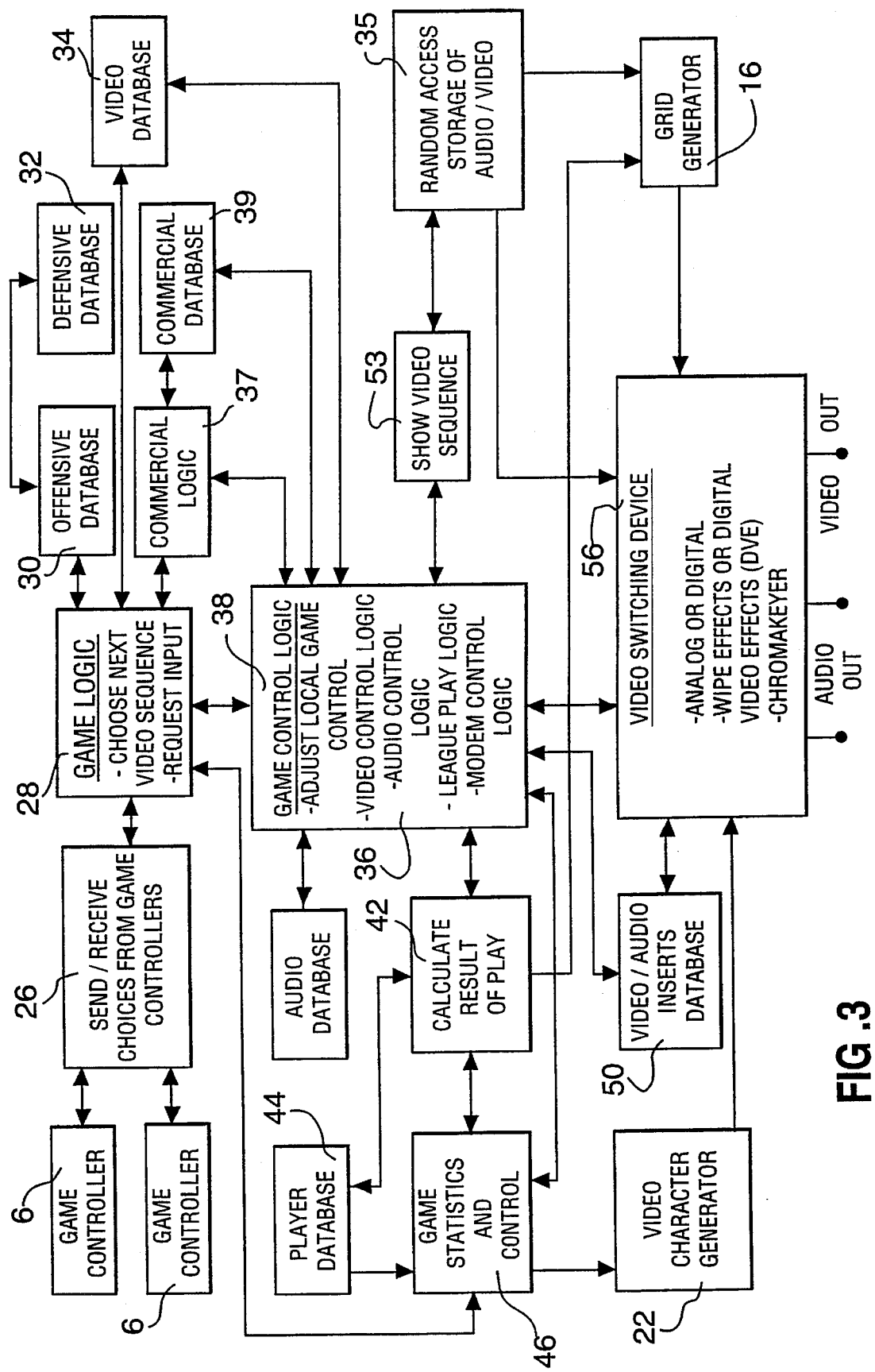
FIG. 3 is a software block diagram of the game of the invention.

The software operating CPU 4 will be described now in more detail, having reference to the software block diagram of FIG. 3. The two game controller modules 6 are used to display information and options to the players and send the choices back to the computer via send/receive choices from game controllers 26.

The game logic 28 uses data from the send/receive choices from game controllers 26 to choose the next video sequence and to send information back to or request input from the game controller modules 6.

The offensive database 30 contains the information to rank the basic effectiveness of an offensive call.

The defensive database 32 contains the information to rank the effectiveness of each defense called versus the offense called.

The video database 34 contains information on every video sequence stored in random access storage of video/audio 35. The timing information for each video sequence is also located here and accessed by the video control logic 36.

The commercial logic or advertisement logic 37 works with the game control logic 38 to determine when and where commercials should be played.

The commercial or advertisement database 39 contains information on every commercial in random access storage and keeps a record of how many times each one is played.

The adjust local game control function of game control logic 38 will pass on information about the current video sequence to calculate the result of play at 42. The adjust local game control 38 also manages the logic for the timing and control of all video and audio sequences as well as the control program for the modem link.

The player database 44 contains the profile information on every player in the game. It is updated every time a result of play calculation is made.

The results of play calculations are also passed on to game statistics and control 46 which provides information on score, momentum, player performance and game control variables.

The video graphics character generator 22 creates the graphics for score, yardage and timing updates, player, game and league inserts and any titling or other character generation that may be required.

The video/audio inserts database 50 stores information on all inserts that are available to the video control logic.

The show video sequence 53 controls the driving of video and audio devices such as laser video disks, CD-Rom etc.

The random access storage of video/audio 35 contains all video and audio material. The number and types of devices may be intermixed and include such devices as laser video disk, CD compact audio disc, CD-Rom, computer hard drive and any other random access storage devices.

The grid generator 16 reads the position code information stored in the video signal and generates the appropriate grid of yardage lines and yard numbers.

The analog or digital video/audio switching device 56 is controlled by the video game control logic 38 and switches between all video and audio signals. This device also contains a chromakeyer for keying in the field markings from the grid generator 16 or graphics from the graphics character generator 22.

Figure 4:
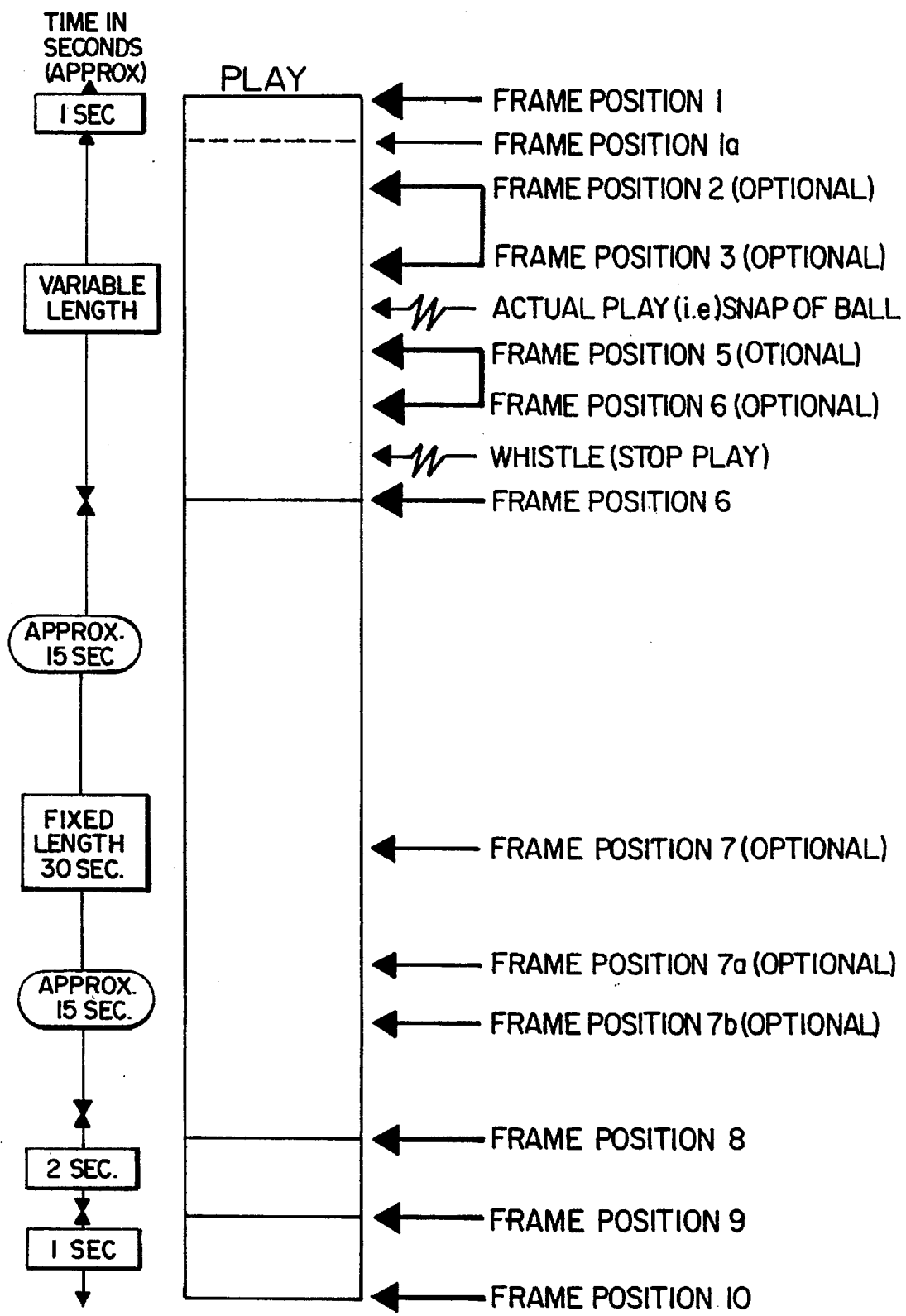
FIG. 4 is a schematic diagram of a video play sequence breakdown for the game in accordance with the present invention.

An important aspect of the game according to the present invention is the play sequence as illustrated in FIG. 4. In particular, the illustrated frame positions represent the following:

Frame Position 1—Start of Video and Audio Sequence
Frame Position 1a—End of 1 sec Video Transition
Frame Position 2 (Optional)—Optional Audio Window for "yardage and down" inserts
Frame Position 3 (Optional)—Actual play (i.e. Snap of Ball) starts approximately here
Frame Position 5 (Optional)—Optional Audio Window For "yardage and down" inserts
Frame Position 6 (Optional)—Whistle (Stop Play) approx. here Frame Position 6—End of Play/Start of Replay Issue Prompts for Player Inputs (Approx. 3–5 seconds after whistle) Start color/SloMo Replay Sequence NOTE: Frame Position 6 (or Start of Replay) will usually occur during real time video before the Slow Motion replay starts, however, this position is backtimed from Frame Position 8 so it's actual position could be in either real time or slow motion video.

Frame Position 7 (Optional)—Optional end of Play sequence. If all prompts have been answered by this time then the Replay sequence can be cut short so the pace of the game can be speeded up in direct response to the players input.

Frame Position 7a (Optional)—Optional end of Play or Edit out Point (Same function as FP8)

Frame Position 7b (Optional)—Optional End of Video (Same function as FP9)

Frame Position 8—Ends prompts and deadline for player inputs. If offense has not entered next choice of play by this time they will be penalized. FP8 will occur 2 seconds before FP9 to allow time for cueing of the next video sequence.

Frame Position 9—End of Play sequence. This is the normal Edit Out point for this video sequence where a picture cut takes place or video transition such as a wipe effect begins. This is also the frame position for audio edits between video sequences.

Frame Position 10—End of video footage. Video transitions must be completed by this frame—1 second after FP9.

The play sequence consists of two main parts:
1) The Play
2) The Replay

The play sequence starts at frame position 1 which is also the first and main edit point in a play sequence. This is also the start of the play portion of the play sequence.

Frame position 1 a marks the end of the video transition that began at the first edit point at frame position 1. The end of the video transition at frame position 1a is not significant in the timing of the play sequence but is included here for clarity and to include all notable frame positions in the play sequence (It is important to keep clear and understand that although the main edit point has already passed and the audio has been edited, the video is still completing the 1 second wipe effect up until frame position 1a).

Prior to the start of play (i.e. snap of the ball), the play by play commentary will be tagged at frame position 2 and frame position 3 to locate an audio window where the existing sync dialogue of the play by play announcer can be deleted and replaced with a voice insert by the same announcer giving yardage and field position updates.

The frame position of the start of the actual football play (i.e. snap of the ball), could be anywhere between frame positions 3 and 4 in the play portion of the play sequence. It is not recorded with a frame position number since it is not important in the timing of the play sequence.

Frame Position 4 and Frame Position 5 mark the location of the in and out points of another audio window. This window occurs after the ball has been taken out of play and a new field position and down has been established. This gives the play by play narrator the opportunity to say where the ball has ended up and what the downage situation is so that the players can be informed for their next play decision.

(There are also readouts of yardage and downs on each player's game controller display. These readouts will be dedicated to this specific function and visible to the players at all times during normal play of the game.)

Both audio windows at Frame Positions 2 and 3 and Frame Positions 4 and 5, are optional windows that will not be automatically used every time they occur. The audio windows will be used at random intervals to vary the structure of the play sequence format. The amount of randomizing will be determined in Alpha/Beta testing of the prototype game and will probably favor the second audio window since it occurs after the current play has been completed, therefore the updated information in the second audio window (Frame Positions 4 to 5) is more useful to the players since they must now make their next play decision.

Although we will not normally use both windows in the same video play sequence, there will be occasions when both windows could be used in the same play. This would give the current yards and downs before the play and the new yards and downs immediately after the play is completed. This type of audio insertion has the added benefit of making the play by play announcing appear to be in real time.

Frame Position 6 marks a timing location backtimed from the end of the play sequence that will trigger the game controllers to prompt for the next player input. It is independent of the start of the slow motion video portion of the replay, but will always occur after the ball has been called out of play. The exact location of Frame Position 6 will be the number of seconds before the end of the play sequence (Frame Position 10) that is needed for the bar players' next play decision inputs, plus the video search buffer time plus the video transition time. In this example, given a player input time limit of 30 seconds, plus 2 second maximum search time, plus a 1 second video transition, frame position 6 will be located 33 seconds before the end of the play sequence (Frame Position 10).

Frame Position 7 will locate the position of an optional edit out point. The exact location of this frame position will vary since each play is different and the optional edit out point must be at a place where both video and audio can be edited together without a break in video or audio continuity.

There are several uses for the optional edit out point at Frame Position 7.

The primary function is to give the players the ability to speed up the pacing of the game for either enjoyment or strategy, by entering their play decisions quickly, within the first half of the time period allowed for entering an input response. This optional edit out point will shorten a play sequence by at least 10 to 15 seconds.

Another use for the optional edit out point is to reduce the amount of replay in the video play sequence and substitute it with a commercial insert, player or game statistics inserts (in the case of league play this could also include a league statistics update.), highlight replay or cutaway. This type of usage will not increase the pace of the game or be as a result of player input. The computer software will determine when and where the optional edit out point is used for these types of inserts.

Although these inserts are not necessary for the playing of the game, they are necessary if we are to break the continuous and ultimately, predictable sequence of play portion followed by replay portion that is standard for each video play sequence. This is one of the techniques we will be using to help create the illusion that the game being played is real and being switched by a live television crew with live announcers.

There are three frame positions given for each optional edit out point. Frame Position 7a will be at a location 8 seconds before the actual edit out point. This will allow a minimum of 5 seconds for the defensive players to react to the display change. Then Frame Position 7b will mark the last frame position available for video search and 1 second for the video transition before the actual edit point at Frame Position 7c.

If the offensive players have entered their 2 play decisions in time to use the optional edit out point, the countdown timer on the defensive player's game controller will change from a steady display of decreasing numbers indicating the normal time left to make a defensive call, to a flashing display showing the new time left to make a call if they are to keep up with the offense's change of pace. With the above timings, the minimum time that the flashing countdown will count is 5 seconds however, for this to actually occur the offensive player must enter their last decision within 30 video frames immediately proceeding Frame Position 7a. Any entry prior to this will give the defense a longer countdown warning on their game controller time display.

Frame Position 8 marks the end of the normal input time period for the players to call the next play. If no play has been called by the offense, there will be a delay of game penalty given to them. If no input was received by the defense, they will be given default values for the game factors which will decrease their chances for a successful defense. In the example given in diagram 1, Frame Position 8 will occur 3 seconds before the end of the play sequence. In a worst case scenario, where the players have entered their final input for the next play just 1 frame before Frame Position 8, the system will have 2 seconds to choose a play and locate it on the appropriate video disk before reaching Frame Position 9.

Frame Position 9 marks the end of the video play sequence and the beginning of the video transition (i.e. wipe effect) to the next video sequence. Position number 9 is also the position where the audio is edited to the beginning of the next video sequence.

The 1 second of video that makes up the video transition is used to overlap the video from the next sequence during the 1 second wipe effect or video transition.

Position number 10 marks the end of the video footage for the video play sequence.

Where a sequence of plays are to be undertaken, the first step in this sequence will be to cue the main video element, such as a video play sequence (selected from laser video storage retrieval means 12) at a location prior to the desired video material that will provide sufficient time for lockup or synchronization of the video picture. If for example the video lockup time is one second, the cue position for the video sequence will be one second or thirty video frames before the edit in point of the cued video sequence. Then when the current play sequence, already in progress, reaches a position one second (thirty video frames) before its "Edit Out Point" the next video sequence will start to roll and sync up with the current video sequence.

When the current Video Sequence reaches its Edit Out Point, the CPU 4 will issue a command to the Video Switching device to start the Video Transition (Wipe Effect Edit) between the two Video Sequences. Since both video sequences will now be synchronized together, when the current Play Sequence reaches its Edit Out Point, the new Play Sequence will reach its Edit In Point at the same time. Once the Edit Point is reached, the edit will take place and the Video Transition will begin.

The Video Transition will always have the current Play Sequence move off screen (i.e. wipe) over top of the next Video Sequence when the next Video Sequence starts in real time. This is almost always the case but one example of an exception would be when we insert a Graphic for game statistics. If this insert occurs during live video from the current play the Insert should wipe in over the current sequence. The video transition cannot exceed he length of the Video portions of the Video Sequence.

Once the final Frame Position on the current Video Sequence has been reached, that video source will go off-line and the new Video Sequence will continue as the Current Video Sequence. In the meantime, the CPU 4 will be issuing similar instructions for the audio inserts that are to be inserted into the selected Optional Audio Windows. It will determine whether the Audio Storage device is located and issue a command to the Audio Storage device to cue that insert an appropriate time ahead of the Insert that will allow sufficient time for the audio to 'lockup' with the Video Play Sequence. When this position is reached, just prior to Frame Position 2 in the Video Play Sequence, the Audio disk will roll and get up to speed in synchronization with the Video Play Sequence so that the starting location for the Audio Insert will correspond with Frame Position 2 (the beginning of the target Audio Window).

When the "in-point" at Frame Position 2 for the Audio Window is reached, the CPU 4 will instruct the Video/Audio Switching device to mute the track containing the Play by Play commentary and replace it with the Audio Insert. When Frame Position 3 is reached, the mute command will be revoked and the original Play by Play commentary will continue.

When the Video Play Sequence reaches Frame Position 6 (FIG. 4), the CPU 4 will send a command back to the Game Controllers requesting the next input from the players for the next video sequence. This sequence will then repeat itself over again.

A key concept that makes the game according to the present invention unique flows from the fact that all plays are videotaped on a playing field that will have all the yardage lines and yardage numbers removed. All other field markings such as hash marks, end zone and boundary lines will remain on the field for reference by the football players and television crew during videotaping of the football plays.

The yardage lines that have been removed will be electronically regenerated and inserted into the video picture in real time and in their proper size and perspective during the playing of the SAT game.

There are several reasons for electronically inserting these lines.

1) First, any play that is recorded and does not show the end zones of the field can be used as a generic play. Since we have not recorded the yard lines, when they are electronically inserted we can position them to suit the current game's field position. This will enable us to place a generic play at virtually any yard line on the field providing, that in the ensuing play action, as mentioned above, the cameras do not show the location of the end zones. This will reduce the number of plays that must be stored in video storage down to a manageable number.

2) By reducing the number of plays that must be stored, we are able to increase the number of video play sequences that can be chosen for any given call by the game players.

For example, if there are 8 possible sequences for any given play at any given field position, there are . . .

2 teams playing on . . .
2 sets of hash marks in . . .
2 directions . . .

we will have total of (8×2×2×2=) 64 play options possible for each generic play.

These yardage lines are generated by dedicated graphics engine 16 that operates independently from the main CPU. The generated grid will be a monochromatic image of 19 straight lines with numbers. This grid will be electronically inserted into the video play sequence through the use of the chromakeyer that will place it over (i.e. the colour green) and under the football players, referees and ball (i.e. any other colour).

In order to position the grid in relation to the camera angle and focal length of the lens, each camera used during videotaping will be equipped with 3 motion sensors. Since these cameras are being operated and moved by human input, there is no simple mathematical equation to describe this movement. Therefore, this motion must be accurately measured and recorded in real time as the play is being videotaped.

The motion sensors must record any movement of the camera in 3 axes. These axes will be the Pan axis (Azimuth) Tilt axis (Altitude) and Zoom axis (Focal Length of camera lens). The Zoom angle is measured by the amount of rotation of the camera lens' focus ring about its axis.

Since the movement of any axis may be very small, each motion sensor must record motion with sub-arcminute resolution.

Figure 5:
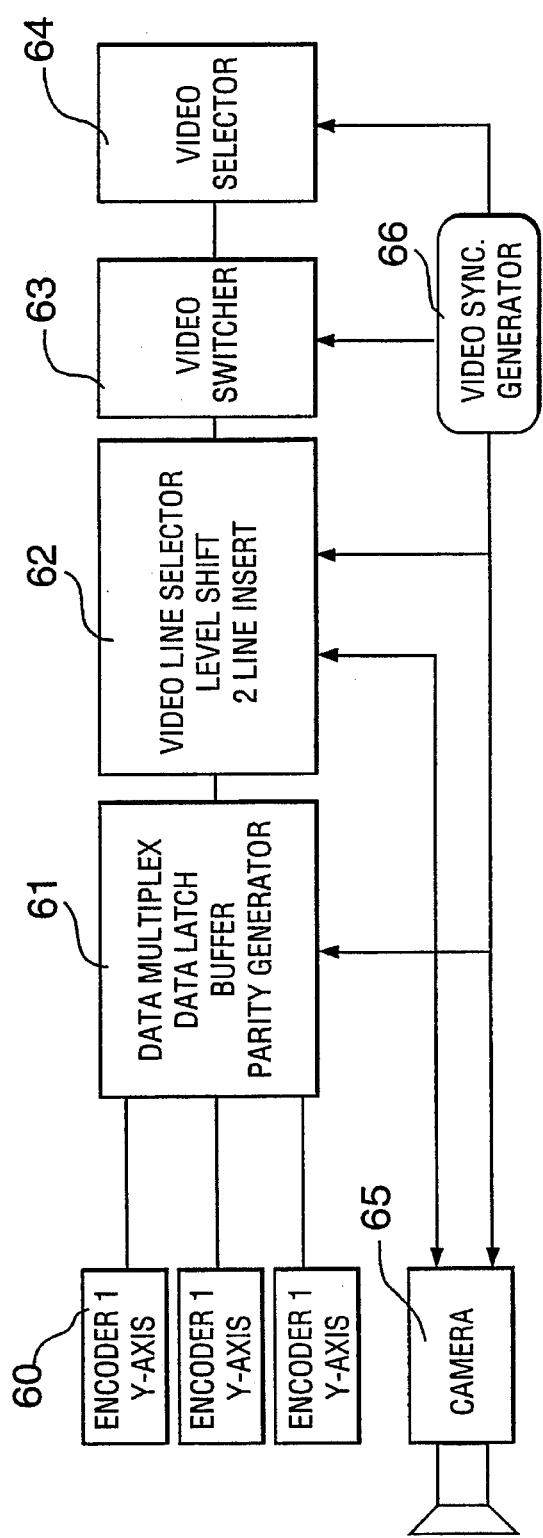
FIG. 5 is a block diagram illustrating an example method for sensing pan, tilt and zoom motion of the camera, encoding this motion into a digital signal or position code, and recording this position code onto an audio channel in the video display in synchronization with the video frame corresponding to that motion ensuring visually proper grid and number insertion into the video play sequence.

As can be seen in FIG. 5, the output from the motion sensors is first converted to binary code at encoder 60. The binary output from the motion sensors is sent to the data multiplex 61 where it is sequenced into correct order and format which records duplicate information and a parity check.

After the position code has been formatted in the data multiplex 61, it is sent to the video line selector 62 when the next vertical sync pulse is received from the video sync generator 66. The video line selector 62 then conforms the specially formatted serial position data to be electronically compatible with the video signal.

The video line selector 62 then selects the proper horizontal lines in the video signal that will store the specially formatted binary position code. The position code is then inserted into the target lines of horizontal video from the video camera 65. This combined signal is then passed on to the video switcher 63 to be "taken" when required and recorded on video tape in the video recorder 64.

Figure 6:
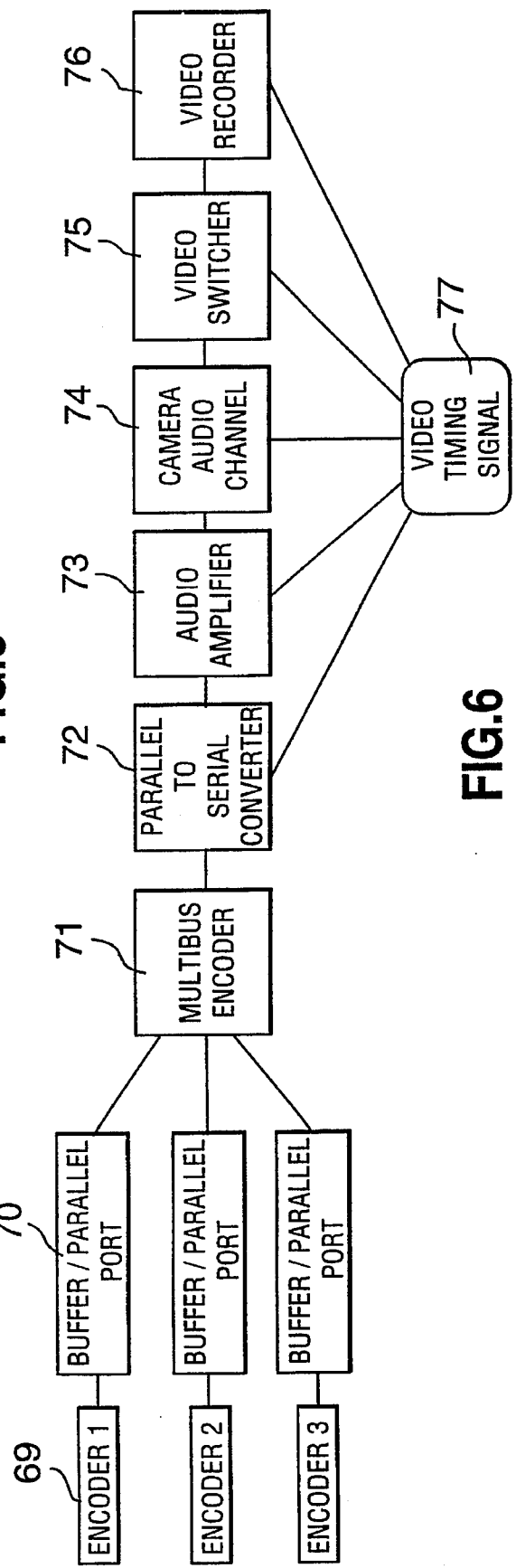
FIG. 6 is a block diagram of an alternative method of inserting the position code into a video line in the vertical interval of the video signal ensuring visually proper grid and number insertion into the video play sequence.

Another method of storing this serial position code, as illustrated in FIG. 6 is to convert it into an analog audio signal and record it on one of the videotape's audio tracks in synchronization with each video frame. As seen in FIG. 6, the output from the motion sensors is first converted into binary code at encoder 69. The binary code is held in a buffer 70 for sequencing into proper order through a multibus encoder 71 to a parallel to serial converter 72. The serial position code is stored in another buffer (not shown) until triggered by the next vertical sync pulse of the video timing signal 77. The serial code is then passed on through a signal or audio amplifier 73 to bring it up to the proper line voltage for insertion into an audio channel in the camera 74. The combined video and audio signal is then passed through the video switcher 75 and recorded by the video recorder 76.

The advantages of this method are that this procedure is easier to do electronically and that the recorded information is separated from the video information so it can be offset during post production if a timing buffer is required for grid generation by the graphics engine. A disadvantage to this method is that the frequency range of the longitudinal audio track limits the bandwidth or in other words, the amount of information that can be stored in this way. Also, since the recorded signal is now in analog form, any change in frequency response or the signal to noise level can cause loss of information.

While two methods of storing the serial position code have been described, others are available. In fact this code may be stored on any other usable area of the recording medium.

The position code must accurately record four basic elements of information:

[Camera ID]+[X axis(Pan)]+[Y axis(Tilt)]+[Z axis(Zoom)]

The camera ID number identifies for the graphics generator, from which camera position we are now viewing the grid in relation to a standard reference position on the playing field. Since there will be 7 cameras shooting the plays, this number will vary from 1–7.

The X axis number identifies the amount of pan, left or right, in seconds of arc, the camera has moved in relation to the standard reference position.

The Y axis number identifies the amount of tilt, up or down, the camera has moved from the standard reference position. The Z axis number identifies the amount of magnification or zoom (i.e. change in focal length of the camera lens) of the video picture in relation to the standard reference position.

In addition to these standard elements the position code will contain an error checking code.

The position code will be read on playback of the video play sequence and sent to the graphics engine (grid generator). The graphics engine will decode the position information found in the video signal or on the audio track, and convert it into display co-ordinates and a magnification factor for the generated grid.

During setup of the video cameras in preparation for the video shoot, they will be initialized with reference to a common reference point and angle of view. The pan, title and zoom angle for each camera, when referenced to this standard reference point, will differ for each camera in relation to its position on or around the field. The values of these three angles will become known variables for each camera (i.e. Camera 1=Var 1x, Var 1y, Var 1z, or Camera 2=V2a etc. ) (NOTE: Each camera will have three variable numbers designated as "VNa" where "V" is the value of the position or zoom angle, "N" is the camera identification number and "a" identifies the axis x, y or z, that is being referred to). The value of the variable V will be determined during the camera initialization routine using the standard reference point. The standard reference point is located approximately in the center of the playing field and is used by all camera's during the camera initialization routine.

Figure 7:
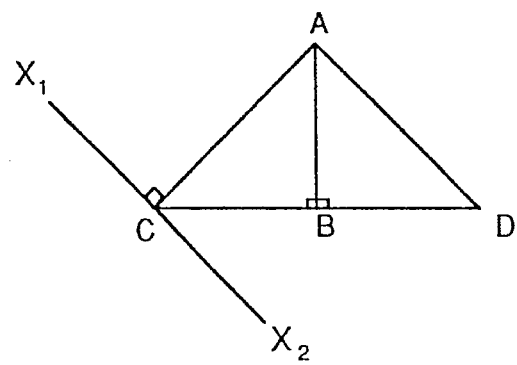
FIG. 7 is a geometric configuration for initializing the position coding of recorded play sequences.

The geometric configuration for the position code is shown in FIG. 7.

Point A represents the standard reference point

Point B represents a point of right angle intersection between the standard reference point (a) and the camera (c) with line AB being parallel to the yardage lines on the field.

Point C represents the position of the camera to the left of point B.

Point D represents another camera to the right of Point B.

Then angle CAB, or angle A, is the amount of counter clockwise rotation required of the grid, which is rotated 0 degrees when viewed from position B, to view it as it would be seen from position C. Clockwise rotation is represented by a positive number, counter clockwise rotation is represented by a negative number.

Any movement of the camera from this reference position can now be calculated by inserting this variable into the position code.

Therefore if the camera at position C is Camera Number 1 then it's position code would now be represented as:

[X axis+(V1x)] [Y axis+(V1y )] [Z axis+(V1z)]

This information will tell us the rotation of the angle of view and magnification of the field markings but is only valid for one position on the field, i.e. with the fifty yard line on the standard reference point. If we are to move the field markings on the field, then we must define two more numbers.

Figure 8:
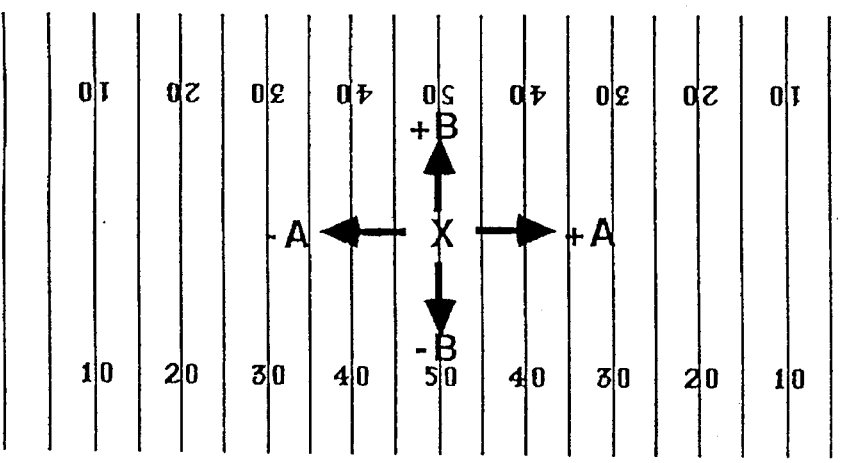
FIG. 8 is a schematic view of a football field grid generated in accordance with the invention modified for purposes of explanation.

If the exact center of the football grid in FIG. 8 represents the standard reference point, then any shift or movement of the grid on the plane of the playing surface of the field, can be represented by plus or minus values of A and B. The positive values of A represents a positive movement of the grid to the right of the standard reference point and a negative value for A represents a negative movement to the left of the standard reference point.

A positive value for B represents a positive movement of the grid up towards the top of the diagram, or away from the camera position, and a negative value for B represents a negative movement down the diagram or toward the camera position.

The grid's position on the field will be determined by the game logic program in the central CPU. This will be the only communication between the graphics engine 16 and the CPU 4 (FIG. 2).

Using these co-ordinates we can now determine the correct grid position with reference to the ball (yardage line and hash mark) and combine that with the camera's position code to view the correct field position from any initialized camera position.

Therefore:

Grid Position=A,B

Position Code=[X+(Vnx)], [Y+(Vny)], [Z+(Vnz) ]

As an alternative to using motion sensing as a means of inserting the grid into the video image, it is envisaged that the grid image could be digitized so that it could be processed in a digital domain. In this process, the video footage could be shot with yardage markings on the playing field, with every single yard line being marked in a repeating sequence of five unique colors. Once these colors have been digitized (i.e. through a digital chromakey) they will each have an assigned value according to the color system or computer program being used (i.e. a 256 color system will assign values for different colors ranging from 1 to 256).

Once these values are known, the computer program can select the four unwanted colors (i.e. four unwanted values) and change these values to represent the color green. This would make the lines disappear into the grass. The remaining wanted line can then be reassigned a value to make its color white. With this system, the need for sensing the motion of the cameras would be avoided since the video image would contain all the necessary positioning and sizing information.

As yet a further alternative approach to the question of grid lines, it would also be feasible for the pre-recorded action footage plays to display normal field markings of linage lines and numbers, with a limited number of lines of scrimmage available to the player, so that the results of each play used would be compatible with this limited number of lines of scrimmage.

The video play sequence is a basic element of the football game according to the present invention. It is the actual football play itself. The video play sequence will include all runs, passes and kicks (including punts, field goals, converts and kickoffs, i.e. all football plays stored in video).

The video play sequence will consist of two main parts, the play and the replay.

The play portion will always be in real time and start prior to bringing the ball into play and end after the ball is brought out of play with the referee's whistle. If the real time action continues with events such as penalties, injuries, fights etc. the play portion of the video play sequence will continue until no new action pertinent to the game occurs. Shortly after that, the game controllers will prompt their players to call their next decisions for the play.

The replay portion of the video play sequence will always start after the ball has been taken out of play and no more new action pertinent to the game occurs. The replay portion of the play sequence will recap the current play while the players are entering their next game decisions. The replay will always continue to the end of the video play sequence. In this way, the final frame of every video play sequence will always be either in slow motion, a freeze frame or a graphics insert and thus provide a universal edit point back into the real time motion of the beginning of the next video play sequence and avoid visual or audible continuity problems with the edit. The end of the video play sequence will always edit to the next video play sequence with a wipe effect so that it psychologically brings the viewer back into real time without causing time disorientation.

When the coin toss sequence is completed and the programs returns to the game from the commercial break, the first video play sequence, the opening kickoff, will take place.

Since the game players have already entered their calls for the type of kickoff (i.e. normal or short) during the commercial break at the end of the previous sequence (coin toss), the kickoff play sequence will go ahead without any additional player input. At the end of the kickoff, there will be an instant slow motion replay of the highlights of the current play while the game players are prompted, through their game controllers, to make two decisions.

First, they will be asked to select the type of play they want to call, either a run, pass or kick. They will also be given two other options at this time, time out and quit.

If the player calls time out and they have not used their allowed number of time outs, the game controller will ask if the player is sure (Y,N) and then either pause for the regulation time out period by going to a commercial break or, if told No, the game controller will ignore the time out request and continue with normal play.

Similarly, if a player enters a quit response, the game controller will ask the player if they are sure and then either end the game or continue the play, depending on the response. If a player does quit, the game is awarded, by default, to the other team.

If the players did respond correctly to the "select type of play" input command, they will be asked to enter the type of run, type of pass or type of kick they want to call.

The options for type of run will be:
1) Wide left
2) Dive left
3) Down the middle
4) Dive right
5) Wide right The options for type of pass will be:
1) Deep left
2) Short left
3) Down the middle
4) Short right
5) Deep right The options for type of kick will be:
1) Long punt
2) Short punt
3) Field goal These two decisions (type of play and type of run, pass or kick) must be entered by the offense within a limited time period of 30 seconds. This is the length of time currently decided on and could change on testing the final design if it is found to be too short or too long.

If the offense has not made its next play decisions within the allotted time period, they will be penalized with a delay of game penalty and thus have the line of scrimmage moved back five yards.

If the defense fails to respond to the same input commands, they will be given a default value in the game factors so that their chances for a successful blockage of the next play will be reduced. In other words, they were either too slow in making a defensive call or were caught off guard by the offense speeding up the offensive huddle (see below).

Both game controllers will display a timer that will indicate to the players the amount of time remaining before they are penalized for a late call.

The play sequence will also contain an optional edit out point at some position in the replay portion of the play sequence. There are several uses for this optional edit out point.

First, they can be used to help break up the repetitious sequencing of play/replay in play sequence. Since the cutaway sequences are well over 30 seconds in length they can be randomly inserted at these positions to cutaway to crowd, stadium and player's bench shots.

Second, they can be used for inserts of updates of game statistics or player statistics. During league play, it can also be used for inserting league statistics and live updates.

In both of these examples, the timing of the players input responses would not be changed and the offense would not give a quick response.

This "quick response" is the third example of usage of the optional edit out point. If the offense wants to speed up the pace of the game, they can do so by entering their two play decisions before Frame Position 5, thereby allowing the game control program to end the replay sequence before the maximum time allowed, but since it must always be at least 6 seconds before the actual edit out point, for it to make any difference to the 30 second prompt period, it will usually be found approximately halfway (or about 15 seconds) through the replay portion of the play sequence.

They will be given an indication of when their call has been quick enough to end the replay sequence early however, with the same visual cue on the timer display given to the defense (see below).

The defense on the other hand will be given a warning when the offense makes a quick call, the timer on the defensive player's game controller will start flashing and adjust to the remaining time left before the next optional edit out point at Frame Position 5.

This may seem unfair but remember that the offense knows when they have made their inputs and in a real game, they would approach the line of scrimmage and therefore visually warn the defense to hurry up their call so the defense must be given some kind of warning that the quick call has been made.

Figure 9:
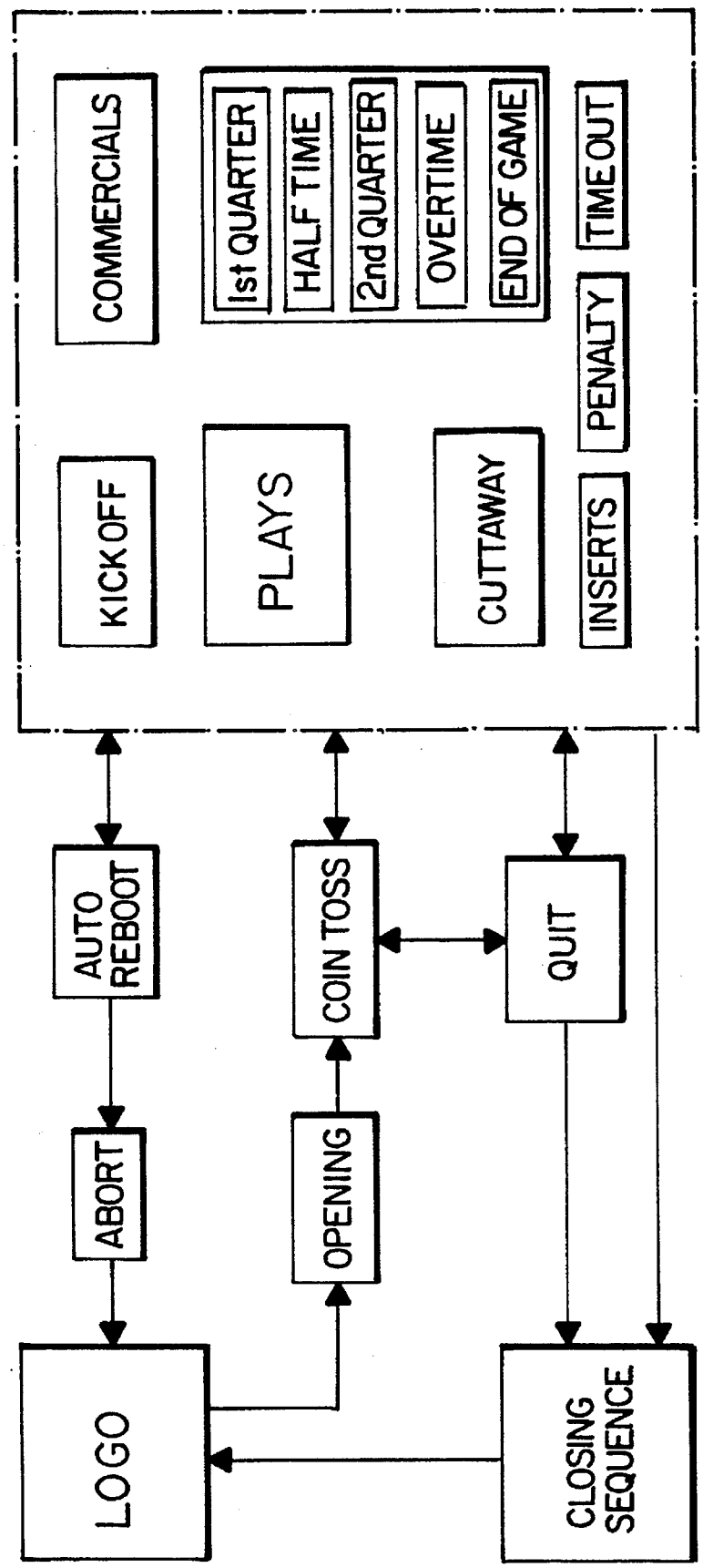
FIG. 9 is a video sequence flow chart showing the various video pathways required in accordance with the invention to link the video sequences together to create a continuous, realtime game.

An example video sequence flow chart is illustrated in FIG. 9, showing the various video pathways that may be provided to link the video sequences together to create a continuous, real time game. (The first video image to appear on the screen after initial bootup, in the illustrated flow chart, is the manufacturer's logo). Commercials and inserts may be included, as illustrated, to help create the illusion that the game is being televised live. The video portion of such inserts might be either wide shots of the stadium and crowds or still pictures of individual players or team logos. These images may be combined with a graphics overlay of the information pertinent to the insert such as a player's statistics, current game statistics such as yards carried, passed, etc. League standing statistics or other information that can be compiled from database information may also be provided. The graphics overlays would be generated by the graphics character generator 22. The video insert could also be a game clock which could be used very effectively during the final moments of a game.

It will be understood that certain game factors may be affected through programming of CPU 4. Those factors include:

1) Team playing factors. Each team will have its own set of playing factors stored in memory. These factors will affect the outcome of the play, for example, a team with a high value of passing will have a better chance for completing a pass play than a team with a low passing play value.

2) Field position. There is an established system for determining the chances of success for a run or pass play according to the field position of that play. This system is used by quarterbacks and coaches to help them determine when it is best to run or pass. We will be using this system or a system similar to it to assign values to a called play according to its field position. This will be most evidenced in field goal attempts.

3) Game situation. As the game progresses, the teams will fatigue. We will already be including player response time in the game factors but we should also consider overall game fatigue so that the more physically demanding plays will be less successful near the end of the quarters and near the end of the game. However, there will be other game situation factors that will also be taken into account such as previous successes. In other words, when a team gets marching down the field, their morale will overcome factors such as fatigue to at least some extent and conversely would probably increase the defense fatigue.

4) Wind conditions. This will be the only weather condition taken into account and will affect all passing and kicking plays. The wind conditions will be randomly determined and announced at the beginning of the game and should be subject to possible changes during the game. For simplicity and for finding a place to announce wind changes, they should only occur between quarters. We can announce wind conditions at the start of each quarter. Note: If the game is shot in an indoor stadium then wind direction and conditions will not be a factor.

5) Random chance. Not every play will be subject to a random factor, in fact, a random factor will only be occasionally included in the game factors. The frequency of this random factor will probably be less than 1 in 10 plays and possibly as low as 1 in 100 plays. It is included to provide sudden surprises in the play of the game and is not intended to replace the "player vs. player" aspect of the game. When the random factor is occasionally included, its affect on the outcome of the play will vary according to its value. A value of 0 (if it is being added into the equation) or 1 (if it is being multiplied) will have the least effect whereas a value of 100 (or whatever the maximum value used) would have the most effect on the outcome of the play. When this maximum value or near maximum value is used it will overpower the other game factors and, depending on the value of these other factors, be the deciding factor in choosing the outcome of the next play. In this way even the worst possible call from the worst possible field position can result in a great play providing the random factor is used and it's value is sufficiently large enough to overpower the other factors used. (Note: Penalties, injuries, fumbles and interceptions will not be determined on a random chance basis.)

When overall game factors are taken into consideration, this should still be a game of skill. When everything else is equal, the player who calls the right plays at the right time should do better than the player who calls it wrong. However, for any single play there will always be that random possibility that even the most novice player can score a touchdown from the worst possible field position. On the other hand, since the random factor is only occasionally used, it is also possible for a novice defensive player to guess exactly what the quarterback is going to do next and block any gains in yardage. A series of good guesses could effectively beat even a skillful experienced player.

In addition, several variations of control modules 6 and other types of input devices are envisaged:

1) Two input devices: This is the system described above and is the simplest form for public use. (Private use machines designed for home rentals should have an optional single user capability. The current design requires two players who represent opposing teams.)

2) Four input devices: By introducing four input devices into a bar area one input device can be designated for each offensive and defensive line on each team. In this way, since input devices will probably be physically attached to the table to prevent theft, this will now involve four tables in the bar, actively involving more patrons, making it more attractive to use.

3) Multiple input devices: It could also be beneficial to provide a multiple input system so that every table in the bar can become involved with this system. The microprocessor would determine which play is called by using the most common input. This could work exceptionally well with the following option.

4) Modem TV network: Since the video images and audio tracks are stored on disk and not in computer memory, the computer is only concerned with control commands for reading control information from the laser disks and stopping and starting the various disk players on preselected tracks. CPU 4 will also be involved with decision making in which disk to select and what track to select and when to start playing. The majority of digital information (i.e. picture and sound) are stored discretely on laser disk. Therefore, if two machines are loaded with the same disk, a modem link of microprocessor control commands should be able to control both sets of laser disks to produce the same program at both locations. This would enable true networking between game systems in different locations.

Thus it is apparent that there has been provided in accordance with the invention a player interactive live action football game that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A pre-recorded, live action and sound with electronically generated graphics overlay, full motion video, interactive athletic contest comprising players of opposite teams playing at various positions on a background field, the game comprising:

(a) a random access storage and retrieval means;

(b) said random access storage and retrieval means for storing a plurality of individual, pre-recorded video images representative of live action plays of the athletic contest illustrating interaction of players of the opposite teams;

(c) a microprocessor and microprocessor control means electronically associated with said random access storage and retrieval means for enabling one or more users to select in sequence through said control means different ones of said plays according to play type, the microprocessor then, by using statistical tables, to select the video image of the actual play according to play type selected by the user; and (d) display means electronically associated with said microprocessor for enabling the selected plays to be viewed by the users;

(e) said microprocessor control means further programmed to evaluate and accumulate play results and to generate an image representative of a position on said background field, said position being determined in accordance With said play results, said microprocessor control means superimposing said position image on said live action image to form a composite image to be displayed upon said display means.

2. A game according to claim 1 wherein said pre-recorded images comprise live action plays which have been recorded on a field without grid lines and numbers, and wherein said microprocessor control means electronically generates said background field image as a grid of yard lines and numbers on the field on the display means corresponding to the play action and location of the teams on the field.

3. A game according to claim 2 further provided with a separate dedicated graphics engine means to generate the grid lines and numbers.

4. A game according to claim 2 further provided with audio storage and audio generation means including synthesis means, the audio generation means correlated with the individual pre-recorded live action plays and arranged so as to provide audio commentary corresponding to the plays displayed on the display means through speaker means electronically associated with the microprocessor and display means, said audio further selected to correspond to the yardage related to the play at any given time.

5. A game according to claim 2, wherein said random access storage means is selected from the group comprising laser disc, CD-ROM, computer hard drive, optical storage means, and magnetic storage means, said game being further provided with audio storage and retrieval means, said audio retrieval means correlated with the individual pre-recorded live action plays and arranged so as to provide audio commentary corresponding to the plays displayed on the display means through Speaker means electronically associated with said microprocessor and display means; said display means being selected from the group comprising TV monitors and display screens.

6. A game according to claim 2, wherein said random access storage and retrieval means store signals representative of the relative axial position and focal length of each camera used to record the video images of the live action plays.

7. A game according to claim 6 wherein said code from the motion sensors is stored electronically in a vertical interval of the audio portion of the video signal in sync with its corresponding video frame of the recording medium.

8. A game according to claim 6 wherein said code from the motion sensors is stored electronically in a vertical interval of a video signal of the video signal in sync with any usable area of the recording medium.

9. A game according to claim 6 wherein the microprocessor is programmed to decode the binary position code and electronically generate a grid of yard lines and numbers that corresponds to the position angle and focal length of the camera that recorded the play.

10. A game according to claim 9 wherein the electronically generated grid of lines and numbers is chromakeyed into the recorded video image so that it is placed correctly on the field in accordance with the accumulated play results of the game at any particular time of the game, the microprocessor being programmed to adjust the yardage numbers and lines to match the yardage and field position for the play being played.

11. A game according to claim 1, wherein said random access storage is selected from the group comprising laser disc, CD-ROM, computer hard drive, optical storage means or magnetic storage means.

12. A game according to claim 1 further provided with audio storage and retrieval means, the audio retrieval means correlated with the individual pre-recorded live action plays and arranged so as to provide audio commentary corresponding to the plays displayed on the display means through speaker means electronically associated with the microprocessor and display means.

13. A game according to claim 12 wherein a plurality of individual commercial messages are stored in said random access storage means and accessed according to the time which has elapsed during play, said commercial messages to be displayed on said display means at predetermined times, and audio signals to accompany said commercial messages when displayed on said display means.

14. A game according to claim 1, wherein said display means are selected from the group comprising T.V. monitors and display screens.

15. A game according to claim 1 wherein said microprocessor is programmed to provide outcome play results based on stored team statistics incorporating a teams strength, momentum and fatigue.

16. A game according to claim 1 provided with a means of generating grid lines using a color encoding means to identify and then remove unwanted grid lines and numbers by changing their colors to match the color the playing surface and highlight wanted grid lines and numbers by changing their colors to white.

17. A game according to claim 1 wherein the pre-recorded plays are displayed on a normal field that includes markings of yardage lines and numbers, said game then to be played with a limited number of field positions from which the ball can be scrimmaged, the results of each play used therein being compatible with these limited number of field positions.

18. In a video game for generating and displaying on a display device a contest of opposing teams to be played by at least one user, each team comprising at least one character, the contest to be carried out at variable positions on a playing field, apparatus for displaying a selected one of a plurality of first images representing predetermined contest plays, said apparatus comprising:

a) means for storing said plurality of first images of contest plays;

b) means manually actuated by the user for providing a signal indicative of a selected one of said plurality of first images of the contest plays to be displayed;

c) means responsive to said signal for accessing from said storing means the selected one first image of a contest play to be displayed;

d) means for determining the variable playing field position as a result of the contest of the selected one first image of a contest play; and e) means for generating a second image representative of the determined playing field position; and f) means for superimposing said selected one first image of a contest play and said second image.

19. A pre-recorded, live action and sound with electronically generated graphics overlay, full motion video, interactive game to be played on at least one viewing screen by at least one user, said game comprising:

(a) random access storage and retrieval means for storing a plurality of individual, pre-recorded action plays illustrating interaction of players of opposite teams, a plurality of individual commercial messages being stored in said random access storage means and accessed according to the time which has elapsed during play;

(b) a microprocessor and microprocessor control means electronically associated with said random access storage and retrieval means for enabling at least one user to select in sequence through said control means different ones of said plays according to play type, said microprocessor then, by using statistical tables, to select the video image of the actual play according to play type selected by the user, said microprocessor further programmed to evaluate and accumulate play results and report them to the users in a meaningful way; and (c) display means electronically associated with said microprocessor for enabling the selected plays to be viewed by the users; said audio storage and retrieval means comprising audio retrieval means correlated with the individual pre-recorded live action plays and arranged so as to provide audio commentary corresponding to the plays displayed on said display means through speaker means electronically associated with said microprocessor and said display means, said commercial messages to be displayed on said display means at predetermined times, and audio signals to accompany said commercial messages when displayed on said display means.

* * * * *